US009249976B2

(12) United States Patent
Bellino et al.

(10) Patent No.: US 9,249,976 B2
(45) Date of Patent: Feb. 2, 2016

(54) METHOD FOR SERVICING A COMBUSTOR CAP ASSEMBLY FOR A TURBINE

(75) Inventors: Mark Carmine Bellino, Greenville, SC (US); Charles Van Buchan, Greer, SC (US); Robert Wade Clifford, Duncan, SC (US); Daniel James Dorriety, Travelers Rest, SC (US); Steven Charles Woods, Easley, SC (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 13/535,897

(22) Filed: Jun. 28, 2012

(65) Prior Publication Data

US 2014/0000111 A1    Jan. 2, 2014

(51) Int. Cl.
    *F23R 3/00*     (2006.01)
    *B23K 1/00*     (2006.01)
    *B23P 6/00*     (2006.01)

(52) U.S. Cl.
    CPC .............. *F23R 3/00* (2013.01); *B23K 1/0018* (2013.01); *B23P 6/002* (2013.01); *B23P 2700/13* (2013.01); *F23R 2900/00019* (2013.01); *Y10T 29/49233* (2015.01)

(58) Field of Classification Search
    CPC ............ B23P 6/00; B23P 6/002; B23P 6/005; B23P 2700/13; B23K 2201/001; B23K 1/0018; F01D 5/005; F01D 9/02; F01D 9/04; F01D 9/044; F01D 9/047

USPC ............... 29/888.011, 402.08, 889.1, 889.22, 29/402.03, 402.04–402.07, 402.01, 426.4
    See application file for complete search history.

(56) References Cited

U.S. PATENT DOCUMENTS

| 5,357,745 | A    |   | 10/1994 | Probert |
|---|---|---|---|---|
| 5,423,368 | A | * | 6/1995 | Fitts et al. ...................... 164/47 |
| 5,430,935 | A | * | 7/1995 | Yaworsky et al. ............ 29/889.1 |
| 6,112,971 | A | * | 9/2000 | Castaldo et al. ............... 228/126 |
| 6,525,500 | B2 |   | 2/2003 | Hatley et al. |
| 6,532,840 | B2 |   | 3/2003 | Hatley et al. |
| 6,655,027 | B2 | * | 12/2003 | Kastrup et al. ............. 29/890.01 |
| 6,782,620 | B2 | * | 8/2004 | Caldwell et al. ........... 29/890.01 |
| 7,662,091 | B2 |   | 2/2010 | Bagley et al. |
| 7,918,433 | B2 |   | 4/2011 | Melton et al. |
| 2010/0325887 | A1 | * | 12/2010 | Perret ...................... 29/888.011 |

* cited by examiner

*Primary Examiner* — Ryan J Walters
*Assistant Examiner* — Matthew P Travers
(74) *Attorney, Agent, or Firm* — Hoffman Warnick LLC; Ernest G. Cusick

(57) ABSTRACT

According to one aspect of the invention, a method for servicing a combustor cap assembly of a turbine includes determining a defect is present in a center ring of the cap assembly, the center ring being disposed within a plurality of vanes, removing the center ring from the cap assembly. The method also includes placing a replacement center ring in the cap assembly, wherein dimensions of the replacement center ring are substantially the same as the center ring that has been removed and brazing the replacement center ring to the plurality of vanes.

17 Claims, 5 Drawing Sheets

METHOD FOR SERVICING A COMBUSTOR CAP ASSEMBLY FOR A TURBINE

BACKGROUND OF THE INVENTION

The subject matter disclosed herein relates to turbine engines. More particularly, the subject matter relates to servicing a cap assembly of a turbine engine.

In gas turbine engines, a combustor converts chemical energy of a fuel or an air-fuel mixture into thermal energy. The thermal energy is conveyed by a fluid, often air from a compressor, to a turbine where the thermal energy is converted to mechanical energy. These fluids flow downstream to one or more turbines that extract energy therefrom to produce the mechanical energy output as well as power to drive the compressor. Over time, turbine parts may experience wear and degradation due to extreme conditions caused by flow of heated fluid within the turbine engine.

For example, combustion dynamics and combustion temperatures in selected locations, such as the combustor and turbine nozzle assemblies, may lead to thermal stress and wear of parts in the assemblies. In some cases, repairing or replacing a single part of the assembly can lead to replacement of an entire assembly. Replacing an entire assembly due to a defect in a single part within the assembly is a costly and time consuming service process.

BRIEF DESCRIPTION OF THE INVENTION

According to one aspect of the invention, a method for servicing a combustor cap assembly of a turbine includes determining a defect is present in a center ring of the cap assembly, the center ring being disposed within a plurality of vanes, removing the center ring from the cap assembly. The method also includes placing a replacement center ring in the cap assembly, wherein dimensions of the replacement center ring are substantially the same as the center ring that has been removed and brazing the replacement center ring to the plurality of vanes.

According to another aspect of the invention, a method for servicing a combustor of a turbine, the combustor including a cap assembly, is provided. The method includes determining a defect is present in a center ring of the cap assembly, the center ring being disposed within a plurality of vanes, removing the center ring from the cap assembly by a process that does not substantially load the plurality of vanes, thereby enabling the plurality of vanes to remain structurally intact during the removing, placing a replacement center ring in the cap assembly, wherein dimensions of the replacement center ring are substantially the same as the center ring that has been removed and coupling the replacement center ring to the plurality of vanes.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
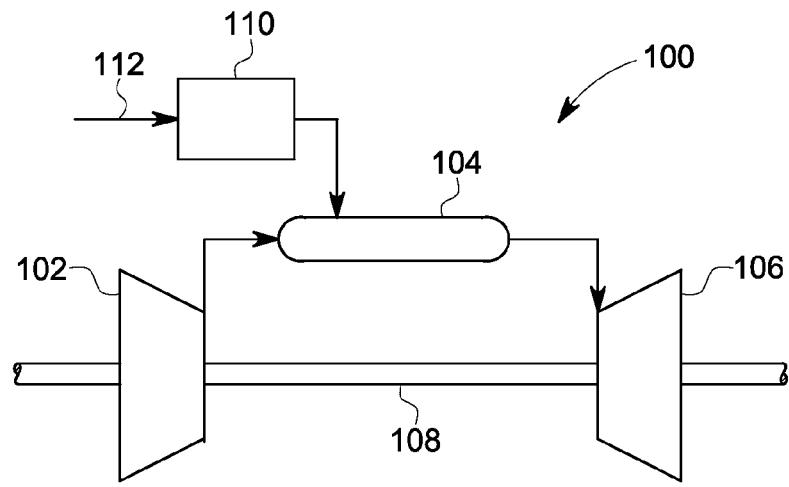
FIG. 1 is a schematic drawing of an embodiment of a gas turbine engine, including a combustor, fuel nozzle, compressor and turbine.

FIG. 1 is a schematic diagram of an embodiment of a gas turbine system 100. The system 100 includes a compressor 102, a combustor 104, a turbine 106, a shaft 108 and a fuel nozzle 110. In an embodiment, the system 100 may include a plurality of compressors 102, combustors 104, turbines 106, shafts 108 and fuel nozzles 110. As depicted, the compressor 102 and turbine 106 are coupled by the shaft 108. The shaft 108 may be a single shaft or a plurality of shaft segments coupled together to form shaft 108. Further, the system 100 may also include a plurality of compressors 102 and turbines 106 disposed about a turbine axis (not shown).

In an aspect, the combustor 104 uses liquid and/or gas fuel, such as natural gas or a hydrogen rich synthetic gas, to run the turbine engine. For example, fuel nozzles 110 are in fluid communication with a fuel supply 112 and pressurized air from the compressor 102. The fuel nozzles 110 create an air-fuel mix, and discharge the air-fuel mix into the combustor 104, thereby causing a combustion that creates a hot pressurized exhaust gas. The combustor 104 directs the hot pressurized exhaust gas through a transition piece into a turbine nozzle (or "stage one nozzle"), causing turbine 106 rotation as the gas exits the nozzle or vane and gets directed to the turbine bucket or blade. The rotation of turbine 106 causes the shaft 108 to rotate, thereby compressing the air as it flows into the compressor 102. In an embodiment, combustion dynamics and associated temperatures can lead to thermal distress of components, such as components in the combustor 104 used for fuel and air distribution. In some cases, wear and thermal degradation of combustor 104 components leads to servicing and/or replacement of the components. Methods and systems that may be utilized for servicing a turbine component are discussed in detail below with reference to FIGS. 2-6.

As used herein, "downstream" and "upstream" are terms that indicate a direction relative to the flow of working fluid through the turbine. As such, the term "downstream" refers to a direction that generally corresponds to the direction of the flow of working fluid, and the term "upstream" generally refers to the direction that is opposite of the direction of flow of working fluid. The term "radial" refers to movement or position perpendicular to an axis or center line. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it can be stated herein that the first component is "radially outward" or "outboard" of the second component. The term "axial" refers to movement or position parallel to an axis. Finally, the term "circumferential" refers to movement or position around an axis. Although the following discussion primarily focuses on gas turbines, the concepts discussed are not limited to gas turbines and may apply to any suitable rotating machinery, including steam turbines. Accordingly, the discussion herein is directed to gas turbine embodiments, but may apply to other turbomachinery.

Figure 2:
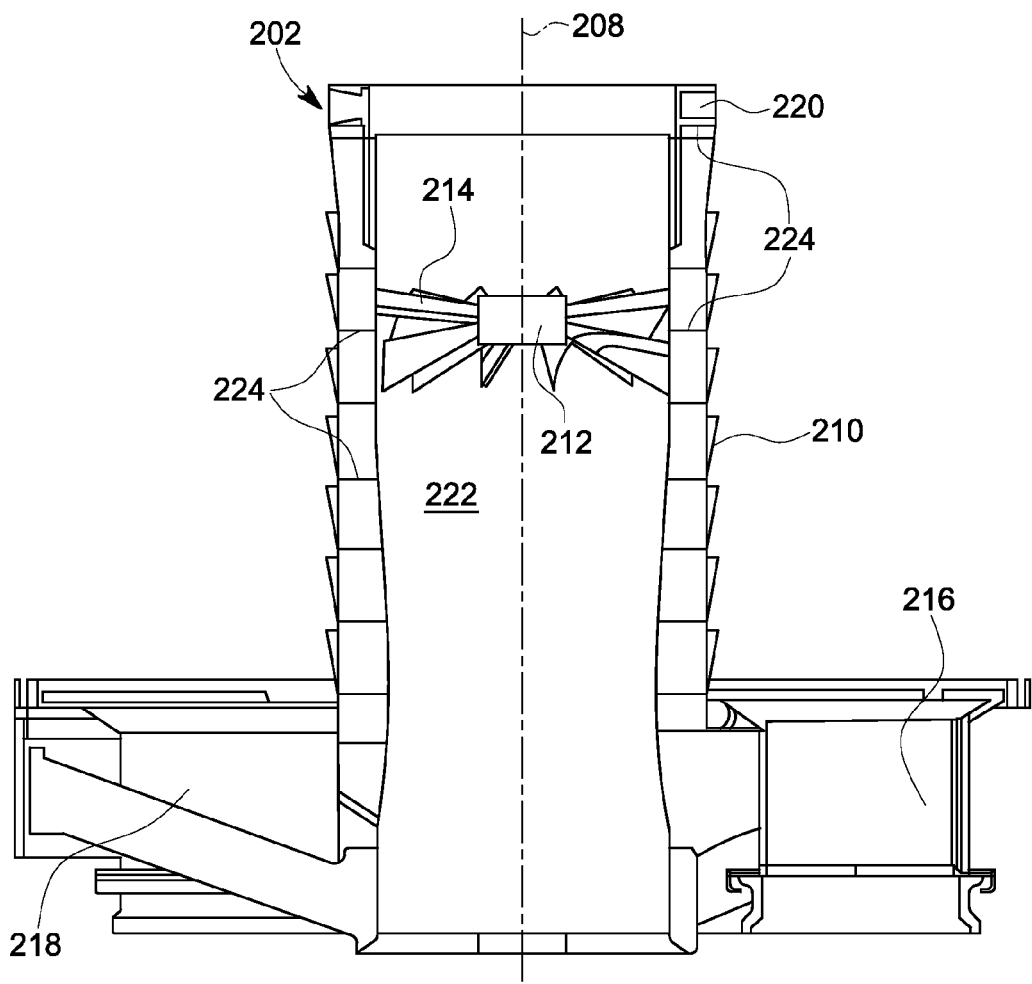
FIG. 2 is a sectional side view of part of an exemplary combustor cap assembly.

FIG. 2 is a sectional side view of an exemplary combustor cap assembly 202, where the section is formed by a plane that runs through an axis 208. The combustor cap assembly 202 is disposed in a turbine combustor, such as combustor 104. The cap assembly 202 includes a center stack 210 where a center ring 212 and vanes 214 are disposed in an annulus 222 of the center stack 210. The cap assembly 202 also includes fuel nozzles 216 and 218 disposed about the center stack 210. In an embodiment, the center stack 210 comprises a plurality of components that are coupled at joints from a base to an end 220, including joints 224, by a suitable process, such as brazing, welding or cladding. The center ring 212 is configured to receive a center fuel nozzle (not shown). The fuel nozzle supplies fuel to mix with air that swirls as it flows through vanes 214, leading to combustion of the mixture downstream of the vanes 214 and center ring 212. Over time, the center ring 212 is exposed to combustion dynamics and thermal stress. In some cases, the wear causes formation of a defect in the center ring 212, where the center ring 212 requires servicing to ensure proper performance of the combustor 200. In one embodiment described in detail below, the cap assembly 202 is placed on a servicing fixture where the entire center ring 212 is removed from the cap assembly 202 while the rest of the cap assembly remains assembled.

Figure 3:
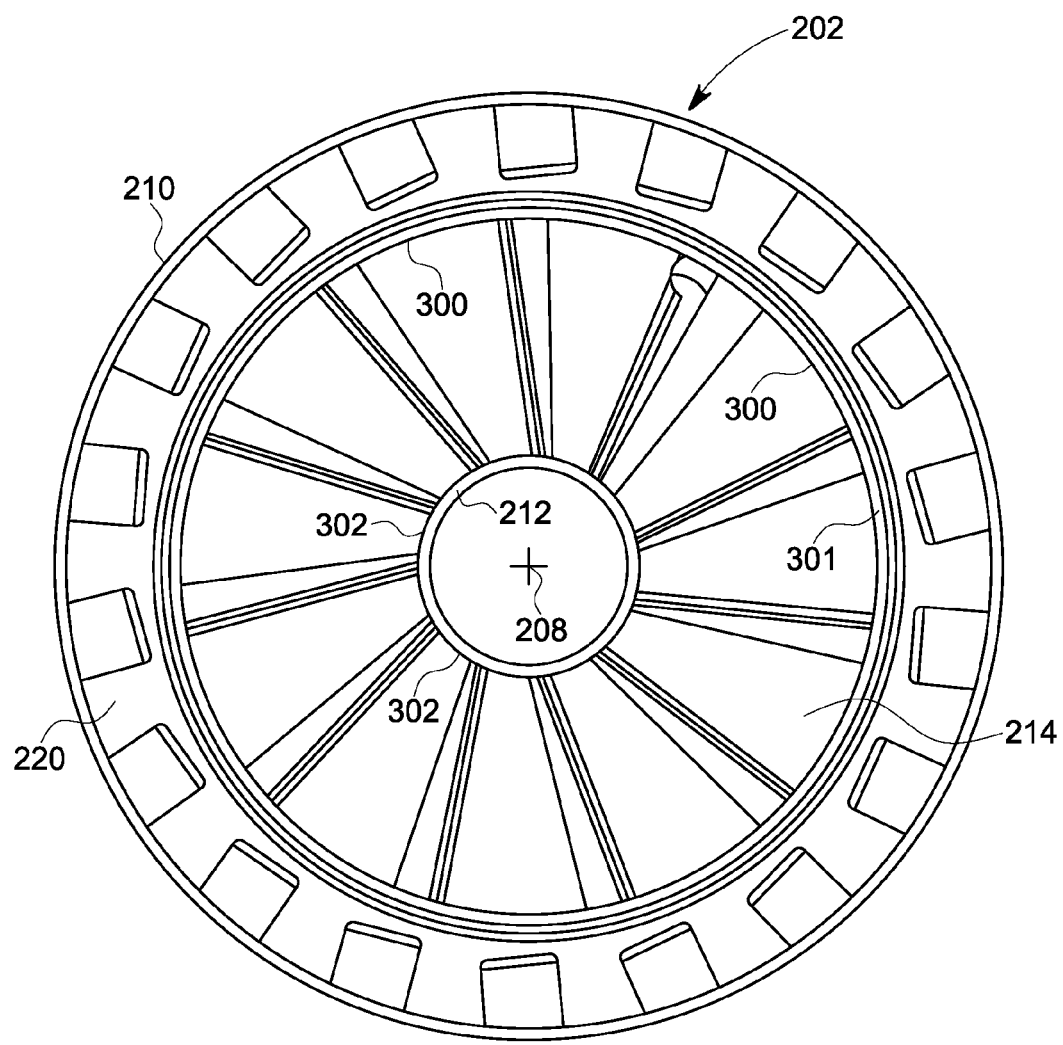
FIG. 3 is a top view of part of the exemplary combustor cap assembly shown in FIG. 2.

FIG. 3 is a top view of the center stack 210 portion of the cap assembly 202 shown in FIG. 2. As depicted, the vanes 214 are coupled to an inner burner tube 301 and center ring 212 via couplings 300 and 302, respectively, where the coupling are formed by a suitable durable method, such as brazing, welding or cladding. In an exemplary servicing process, after a defect occurs in the center ring 212, the entire center ring 212 is removed without substantial loading of the vanes 214. Accordingly, the vanes 214 remain structurally intact during the removing process. In an embodiment, the center ring 212 with the defect is removed by a suitable process, such as electrical discharge machining (EDM), high speed milling, laser removal or waterjetting. In one embodiment, the center ring 212 is removed by high speed milling with a slow feed rate or by EDM, where the vanes 214 are substantially not loaded and retain their geometry during the removal process. In other embodiments, the loading of the vanes 214 during a removal process may alter a geometry of the vanes and adversely affect fuel-air mixing and turbine efficiency.

Figure 4:
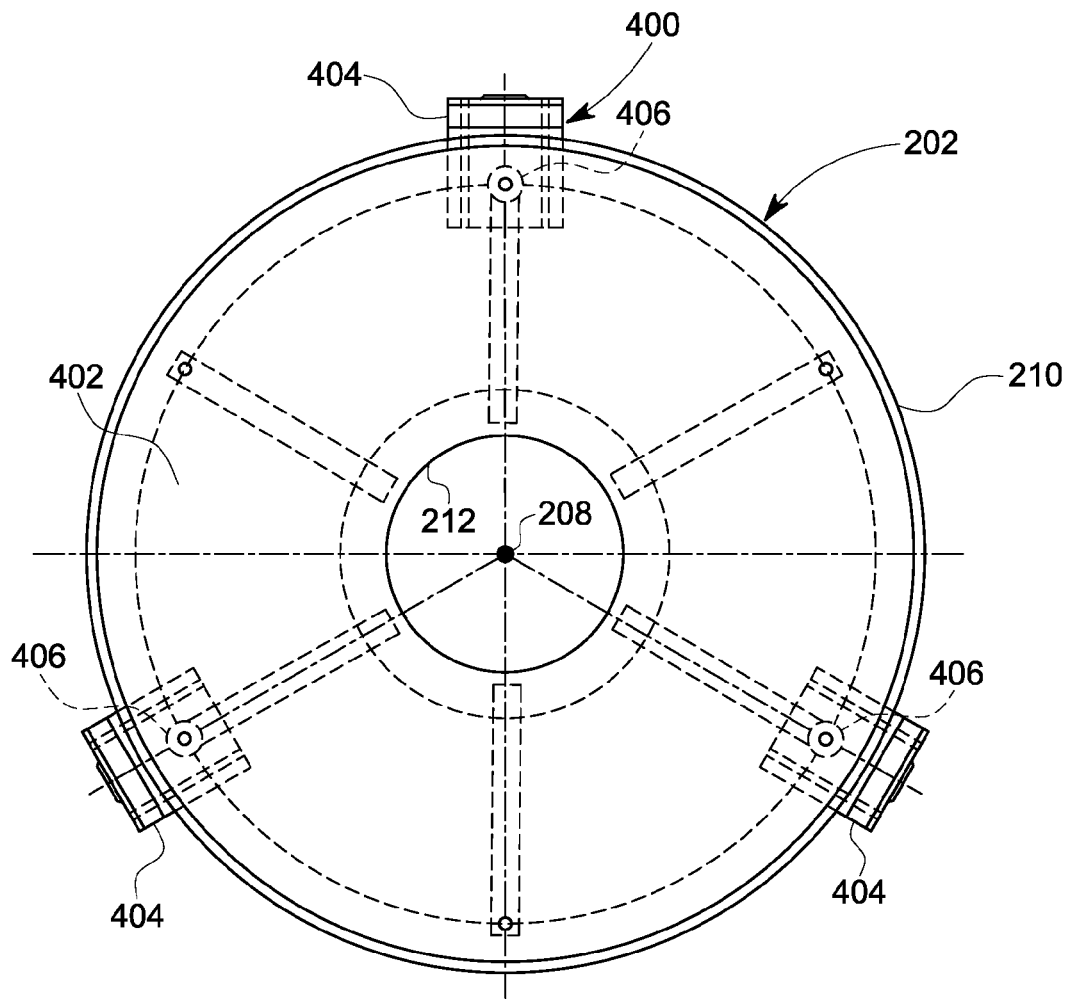
FIG. 4 is a bottom view of a fixture and part of the exemplary combustor cap assembly shown in FIGS. 2 and 3, where the fixture is used to position the cap assembly for a servicing process.

FIG. 4 is a top view of the center stack 210 portion of the cap assembly 202 shown in FIGS. 2 and 3 installed on a fixture 400 for servicing. The fixture 400 provides precise positioning of the cap assembly 202 for removal of the center ring 212 by a selected process. The fixture 400 includes a base 402 and supports 404. The supports 404 each include alignment or orienting features configured to be placed in orienting holes 406 in the cap assembly 202 to provide precise positioning of the assembly during servicing. In an embodiment, the orienting features and orienting holes 406 enable the removal tool to find true center of the cap assembly 202 and center ring 212, thereby enabling precise removal of the ring without structurally impacting the vanes 214. In an embodiment, the fixture 400 is coupled to a suitable apparatus (not shown), such as an EDM machine, configured to precisely remove the center ring 212 after the cap assembly 202 is positioned in the fixture 400.

Figure 5:
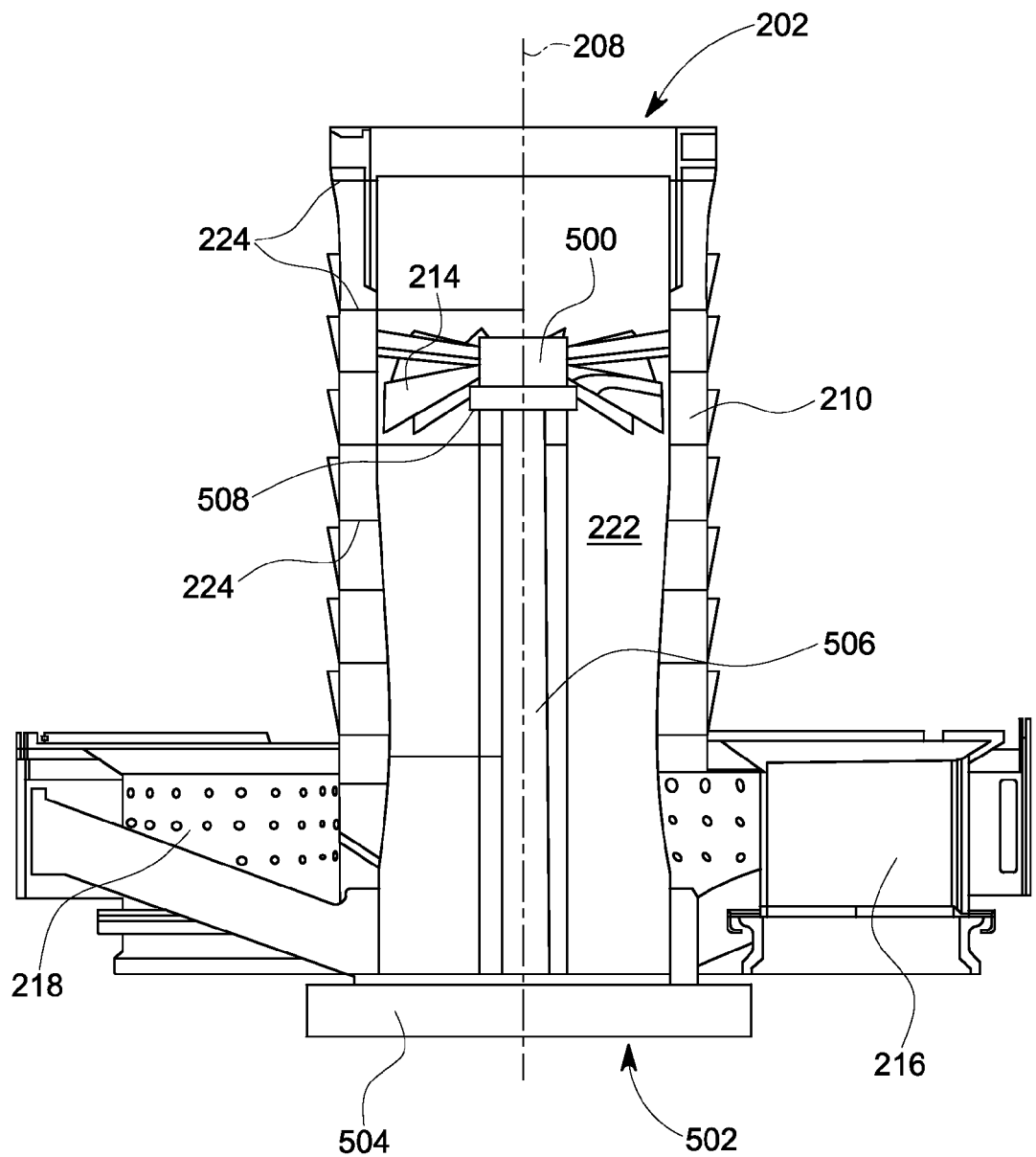
FIG. 5 is a sectional side view of a fixture and part of the exemplary combustor cap assembly shown in FIGS. 2-4, where the fixture is used to position a replacement center ring for a servicing process.

FIG. 5 is a side sectional view of the cap assembly 202 with a replacement center ring 500 on a fixture 502 positioned within the cap assembly 202. The fixture 502 includes a base 504, elongated support 506 and ring platform 508, where the ring platform 508 positions the replacement center ring 500 for coupling to the vanes 214. In an embodiment, the fixture 502 precisely positions the replacement center ring 500 relative to the vanes 214 and cap assembly 202, thereby enabling the replacement center ring 500 to be coupled to the vanes 214. In embodiments, the replacement center ring 500 is substantially identical in dimension and geometry to the original equipment center ring, thus providing the replacement center ring configured to operate with the assembly without substantial modification after installation. For example, the replacement center ring 500 is positioned in the cap assembly 202 and coupled to vanes 214 by a brazing process, where the replacement center ring 500 is not manually machined or modified after being coupled to the vanes 214. Accordingly, the servicing process has reduced manual steps as compared to other processes, thus reducing repair time and the occurrence of defects after repair. Further, the servicing process uses a coupling method, such as brazing, to couple the center ring 500 to the vanes 214 that does not affect joints and couplings in other portions of the cap assembly 202, such as joints 224.

Figure 6:
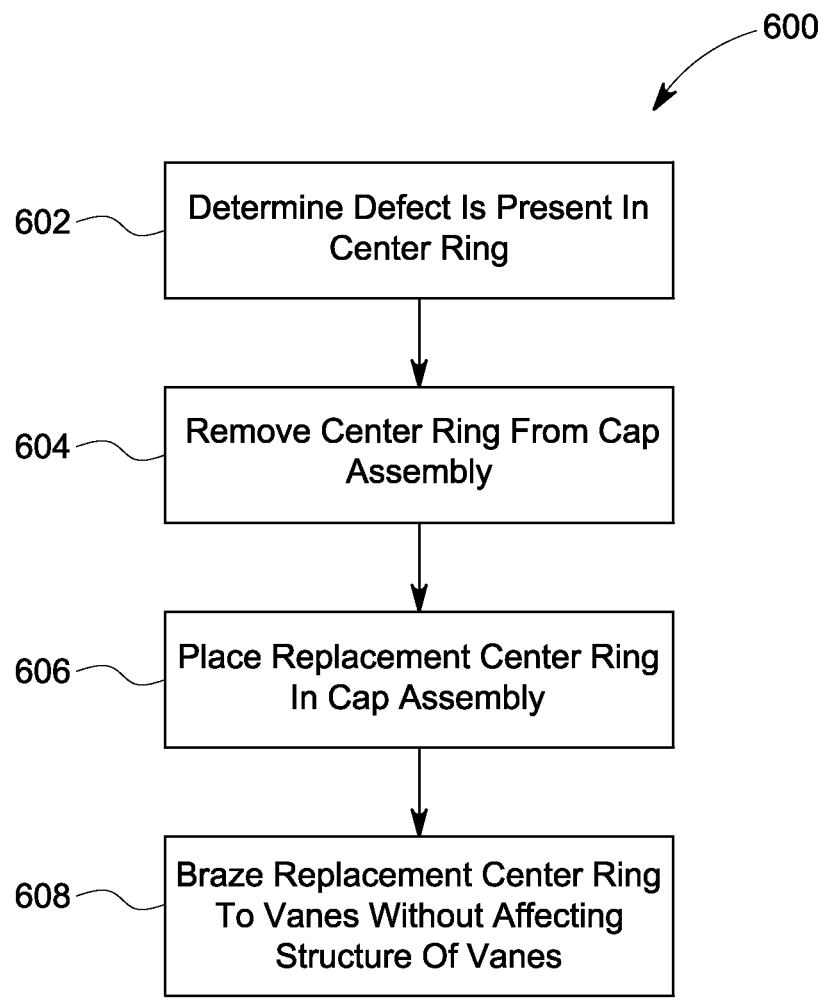
FIG. 6 is a flow chart of an exemplary process for servicing a combustor cap assembly center ring.

FIG. 6 is a flow chart 600 of exemplary steps that may be included in a servicing process for a cap assembly, such as cap assembly 202. The depicted blocks may be part of or in addition to another process and/or may be performed in any suitable order to provide a serviced and operational cap assembly. In block 602, a determination is made that a defect is present in a center ring of a cap assembly. In an embodiment, the defect is a crack or worn portion of an inner sleeve surface of the center ring. In block 604, the center ring is removed from the cap assembly by a suitable method, such as EDM, that has reduced loading of vanes coupled to the center ring. A fixture, such as the fixture 400, may be used to position the cap assembly to enable precise removal of the center ring while enabling the vanes to remain structurally intact. Further, in embodiments, the removal of the center ring does not require disassembly of the cap assembly, thus simplifying the servicing process. In an embodiment, remnants of the removed center ring are removed by a process, such as deburring. In block 606, a replacement center ring is positioned in the cap assembly, where the replacement center ring has substantially the same dimensions and geometry as the original equipment center ring used during production of the turbine engine. In an embodiment, the replacement center ring is positioned in the cap assembly by a fixture, such as fixture 502. In block 608, the replacement center ring is coupled to the vanes by a suitable method to provide a durable bond, such as brazing. In an embodiment, the brazing process uses a suitable brazing material, such as a nickel alloy braze paste. For example, the braze paste may comprise a nickel alloy compound including but not limited to, AMDRY 103, AMDRY 915 or AMDRY 773. In one embodiment, the braze paste material is applied to each joint between the vanes and center ring and is then cycled through various heating stages to cure the coupling. For example, the assembly may be heated to about 1100 to 1300 Fahrenheit (F) for a first period of time, then heated to about 1850 to 2000 F for a second period of time, then heated to about 2060 to about 2160 F for a third period of time and finally cooled to finish the brazing process. In embodiments, the first, second and third periods of time are all the same. In other embodiments, the first, second and third periods of time are different.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for servicing a combustor cap assembly of a turbine, the method comprising:
   determining a defect is present in a center ring of the cap assembly, the center ring being disposed within a plurality of vanes;
   removing the center ring from the cap assembly;
   installing the cap assembly in a fixture, wherein the fixture includes:
      a base axially displaced from the cap assembly,
      an elongated support extending axially from the base,
      a platform coupled to an axial end of the elongated support and configured to position a replacement center ring relative to the plurality of vanes, wherein the platform is substantially coaxial with a radial center of the plurality of vanes,
      at least one radial support coupled to the platform for engaging an orienting hole of the cap assembly and positioning the fixture relative to the plurality of vanes;
   placing the replacement center ring in the cap assembly, on and in contact with the platform of the fixture, wherein dimensions of the replacement center ring are substantially the same as the center ring that has been removed; and
   brazing the replacement center ring to the plurality of vanes including heating a braze material to a temperature ranging from about 1100 and about 1300 degrees Fahrenheit for a period of time, and heating the braze material to a temperature ranging from about 2060 to about 2160 degrees Fahrenheit for a final period of time.

2. The method of claim 1, wherein the braze material comprises a nickel alloy compound.

3. The method of claim 1, wherein removing the center ring from the cap assembly comprises removing the center ring by a process selected from the group consisting of: high speed milling, laser removal and waterjetting.

4. The method of claim 1, wherein removing the center ring from the cap assembly comprises removing the center ring by a process that does not substantially load the plurality of vanes, thereby enabling the plurality of vanes to remain structurally intact.

5. The method of claim 1, wherein removing the center ring from the cap assembly comprises removing the center ring from the cap assembly without removing or disassembling other parts of the cap assembly.

6. The method of claim 1, further comprising: heating the braze material to a temperature ranging from about 1850 to about 2000 degrees Fahrenheit for another period of time.

7. A method for servicing a combustor cap assembly of a turbine, the method comprising:
   determining a defect is present in a center ring of the cap assembly, the center ring being disposed within a plurality of vanes;
   removing the center ring from the cap assembly without removing or disassembling other parts of the cap assembly;
   installing the cap assembly in a fixture, wherein the fixture includes:
      a base axially displaced from the cap assembly,
      an elongated support extending axially from the base,
      a platform coupled to an axial end of the elongated support and configured to position a replacement center ring relative to the plurality of vanes, wherein the platform is substantially coaxial with a radial center of the plurality of vanes,
      at least one radial support coupled to the platform for engaging an orienting hole of the cap assembly and positioning the fixture relative to the plurality of vanes;
   placing the replacement center ring in the cap assembly, on and in contact with the platform of the fixture; and
   brazing the replacement center ring to the plurality of vanes including heating a braze material to a temperature ranging from about 1100 and about 1300 degrees Fahrenheit for a period of time, and heating the braze material to a temperature ranging from about 2060 to about 2160 degrees Fahrenheit for a final period of time.

8. The method of claim 7, wherein dimensions of the replacement center ring are substantially the same as the center ring that has been removed.

9. The method of claim 7, wherein the braze material comprises a nickel alloy compound.

10. The method of claim 7, wherein removing the center ring from the cap assembly comprises removing the center ring by a process selected from the group consisting of: high speed milling, laser removal and waterjetting.

11. The method of claim 7, wherein removing the center ring from the cap assembly comprises removing the center ring by a process that does not substantially load the plurality of vanes, thereby enabling the plurality of vanes to remain structurally intact.

12. The method of claim 7, further comprising: heating the braze material to a temperature ranging from about 1850 to about 2000 degrees Fahrenheit for another period of time.

13. A method for servicing a combustor of a turbine, the combustor including a cap assembly, the method comprising:
   determining a defect is present in a center ring of the cap assembly, the center ring being disposed within a plurality of vanes;
   removing the center ring from the cap assembly by a process that does not substantially load the plurality of vanes, thereby enabling the plurality of vanes to remain structurally intact during the removing;
   installing the cap assembly in a fixture including:
      a base axially displaced from the cap assembly,
      an elongated support extending axially from the base,
      a platform coupled to an axial end of the elongated support and configured to position a replacement center ring relative to the plurality of vanes, wherein the platform is substantially coaxial with a radial center of the plurality of vanes, and
      at least one radial support coupled to the platform for engaging an orienting hole of the cap assembly and positioning the fixture relative to the plurality of vanes;
   placing the replacement center ring in the cap assembly, on and in contact with the platform of the fixture, wherein dimensions of the replacement center ring are substantially the same as the center ring that has been removed; and coupling the replacement center ring to the plurality of vanes through a brazing process including heating a braze material to a temperature ranging from about 1100 and about 1300 degrees Fahrenheit for a period of time, and heating the braze material to a temperature ranging from about 2060 to about 2160 degrees Fahrenheit for a final period of time.

14. The method of claim 13, wherein the material comprises a nickel alloy compound.

15. The method of claim 13, wherein removing the center ring from the cap assembly comprises removing the center ring by a process selected from the group consisting of: high speed milling, laser removal and waterjetting.

16. The method of claim 13, wherein removing the center ring from the cap assembly comprises removing the center ring from the cap assembly without removing or disassembling other parts of the cap assembly.

17. The method of claim 13, further comprising: heating the braze material to a temperature ranging from about 1850 to about 2000 degrees Fahrenheit for another period of time.

* * * * *